Oct. 5, 1943.  E. HOO  2,330,974
HYDRAULIC VEHICLE JACK
Filed July 20, 1942   3 Sheets-Sheet 2
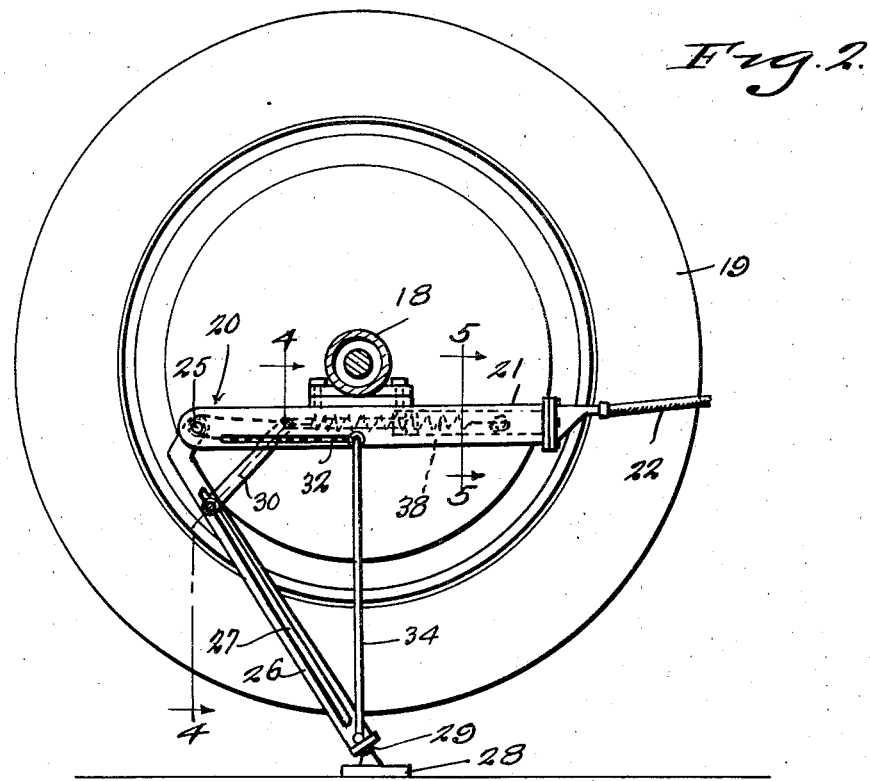
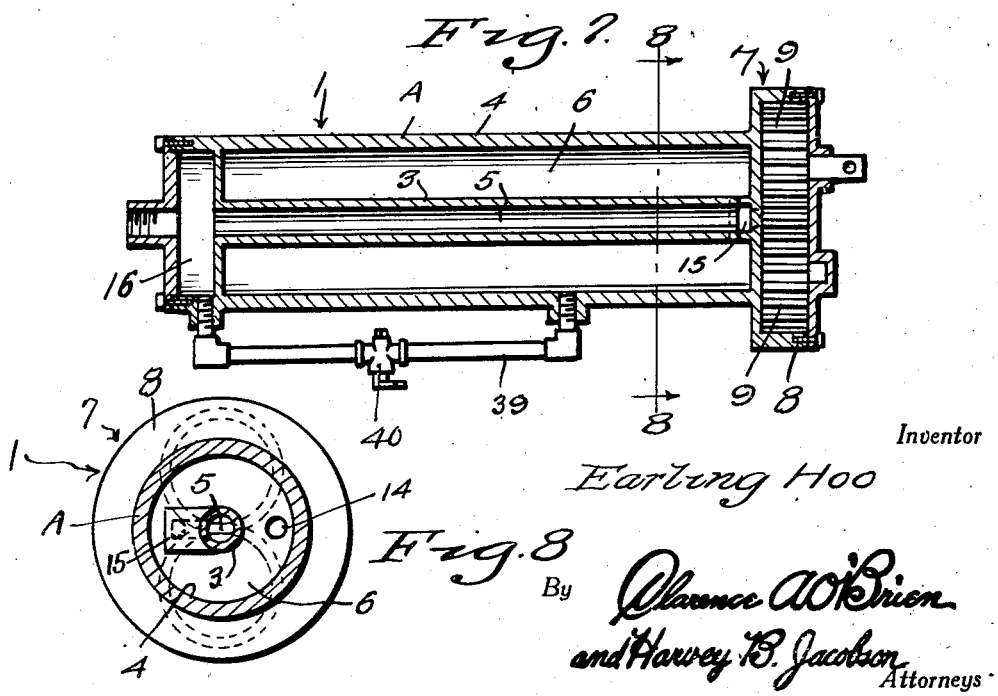
Inventor
Earling Hoo Oct. 5, 1943.  E. HOO  2,330,974
HYDRAULIC VEHICLE JACK
Filed July 20, 1942  3 Sheets-Sheet 3
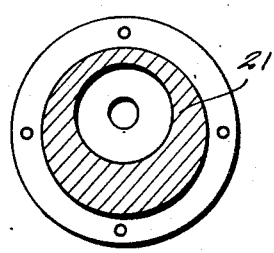
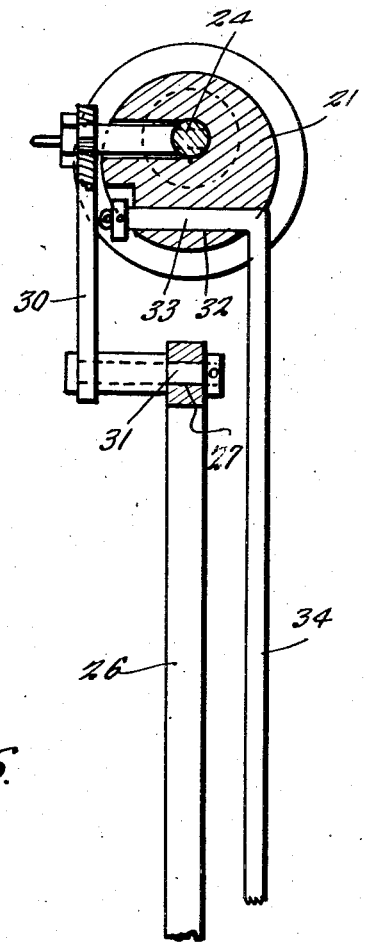
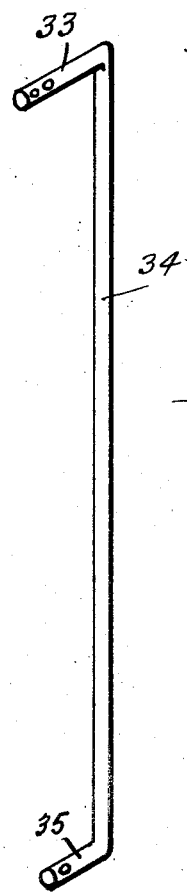
Inventor
Earling Hoo
By Clarence A. O'Brien
and Harvey B. Jacobson
Attorneys Patented Oct. 5, 1943

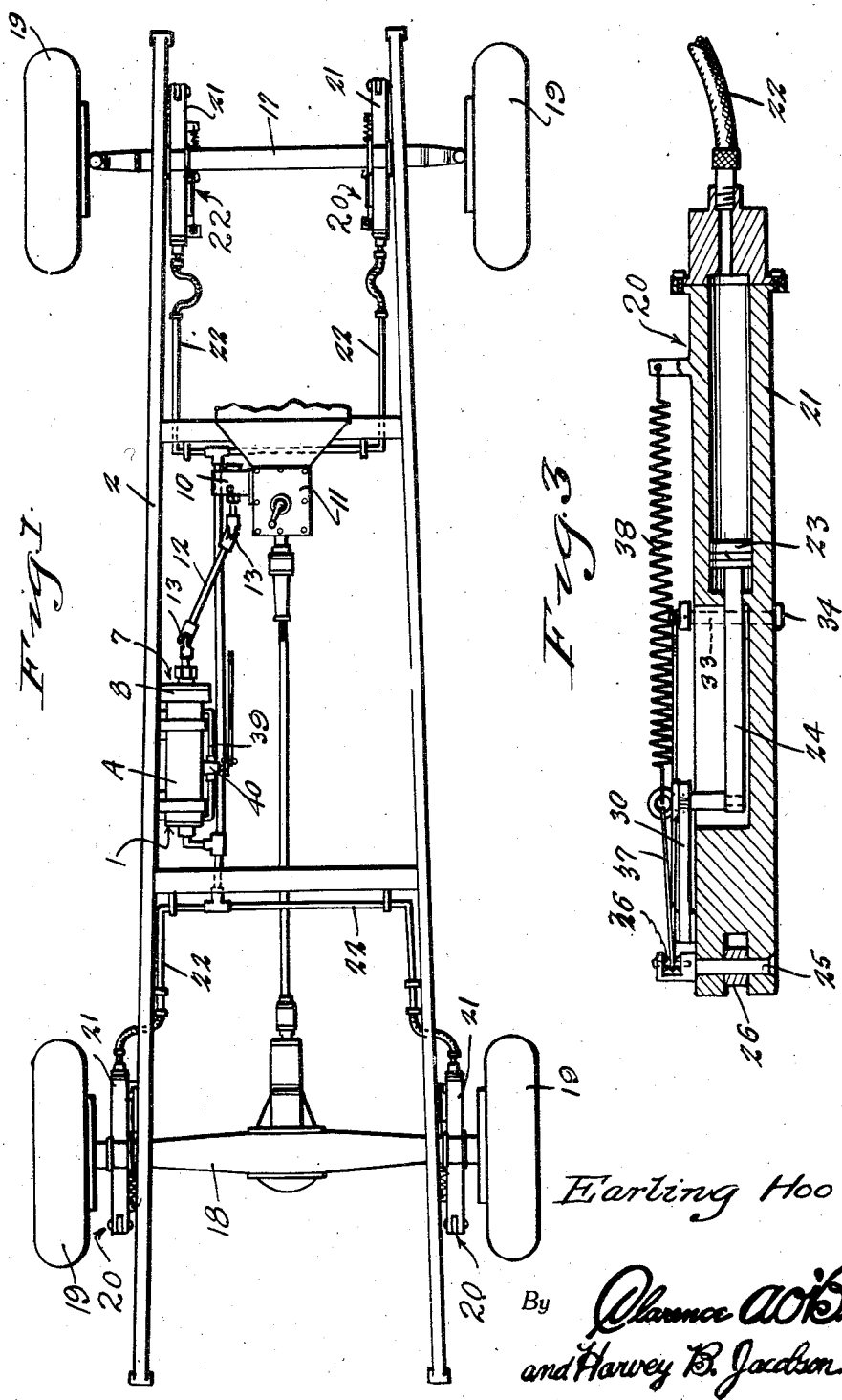

2,330,974

UNITED STATES PATENT OFFICE 2,330,974

HYDRAULIC VEHICLE JACK

Earling Hoo, Excelsior, Minn.

Application July 20, 1942, Serial No. 451,602

1 Claim. (Cl. 254—86)

The present invention relates to new and useful improvements in hydraulic jacks for motor vehicles and has for its primary object to provide, in a manner as hereinafter set forth, an apparatus comprising a novel construction and arrangement whereby the engine of the vehicle may be conveniently utilized for expeditiously lifting or elevating said vehicle through the medium of a suitable power take-off on the transmission.

Another very important object of the invention is to provide a hydraulic vehicle jack of the aforementioned character which includes a pump unit of unique construction for actuating the fluid operated lifting members or arms.

Still another very important object of the invention is to provide a hydraulic vehicle jack of the character described comprising novel means for returning the elevating or lifting members to inoperative position when the vehicle is lowered.

Other objects of the invention are to provide a hydraulic vehicle jack which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of a motor vehicle chassis equipped with an apparatus constructed in accordance with the present invention.

Fig. 2 is a cross sectional view through the rear axle housing of the vehicle, showing one of the jacks in side elevation and in operative position.

Fig. 3 is a view in horizontal section through one of the cylinders.

Fig. 4 is a cross sectional view, taken substantially on the line 4—4 of Fig. 2.

Fig. 5 is a cross sectional view, taken substantially on the line 5—5 of Fig. 2.

Fig. 6 is a detail view in perspective of the safety rod.

Fig. 7 is a view in horizontal section through the pump unit.

Fig. 8 is a cross sectional view, taken substantially on the line 8—8 of Fig. 7.

Referring now to the drawings in detail, it will be seen that the embodiment of the invention which has been illustrated comprises a pump unit which is designated generally by reference numeral 1. The pump unit 1 is firmly secured in any suitable manner on the chassis 2 of a motor vehicle.

The pump unit 1 comprises a cylinder A including spaced inner and outer walls 3 and 4, respectively, (Figure 7) defining inner and outer chambers 5 and 6, respectively. The comparatively large outer chamber 6 constitutes a fluid reservoir.

The cylinder A of the unit 1 has mounted on one end thereof a pump 7. The pump 7 includes a casing 8 in which a pair of meshed gears 9 (Figure 7) are rotatably mounted. One of the gears 9 is driven from a suitable power take-off 10 (Figure 1) on the transmission 11 of the motor vehicle through the medium of a shaft 12 and universal joints 13. The fluid reservoir 6 communicates with the intake side of the pump 7 through a port 14 (Figure 8). The discharge side of the pump 7 communicates with the chamber 5 through a port and passage 15. In one end portion of the cylinder A, the inner chamber 5 terminates in an enlarged end portion 16.

Mounted on the front and rear axles 17 and 18, respectively, of the vehicle adjacent each of the four wheels 19, is a hydraulic jack which is designated generally by the reference numeral 20 (Figure 1). The jacks 20 comprise horizontal, longitudinally extending cylinders 21 which are rigidly secured in any suitable manner beneath the axles 17 and 18. The cylinders 21 communicate with the chamber 5 of the pump unit 1 for receiving fluid under pressure therefrom and for returning said fluid thereto through conduits 22. Fluid actuated pistons 23 (Figure 3) are mounted for sliding movement in the cylinders 21 on rods 24.

Pivotally secured, as at 25 (Figure 2), on one end portion of the cylinders 21 are lifting arms 26. The arms 26 are mounted for swinging movement in a vertical plane and have formed therein longitudinal slots 27. Ground engaging feet 28 are mounted on the free ends of the lifting arms 26 through the medium of universal joints 29. Fixed to the outer end portions of the piston rods 24 are operating arms 30. As illustrated to advantage in Fig. 4 of the drawings, pins or the like 31 project from the arms 30 and are engaged in the slots 27 for connecting the arms 26 to the pistons 23 for raising and lowering thereby.

The lower portions of the cylinders 21 have formed longitudinally therein horizontal slots 32. Slidable in the slots 32 are the right angularly extending upper end portions 33 (see Fig. 6) of safety rods 34. The other end portions 35 of the safety rods 34 are pivotally connected to the free end portions of the arms 26.

Also mounted on the cylinders 21 are pulleys 36 (Figure 3). Flexible wires or other strands 37 are trained around the pulleys 36 and have one end connected to the piston rods 24 and their other ends connected to the end portions 33 of the safety rods 34. Coil springs 38 have one end connected to the cylinders 21 and their other ends connected to the rods 24 for returning the pistons 23 and for completing the raising of the arms 26 and return of the safety rods 34.

A return conduit 39 (Figure 7) connects the enlarged portion 16 of the chamber 5 to the fluid reservoir 6. Interposed in the conduit 39 is a suitable control valve 40 to be actuated by the operator of the vehicle.

It is thought that the operation of the apparatus will be readily apparent from a consideration of the foregoing. Briefly, when the gear pump 7 is driven from the transmission 11 of the motor vehicle through the power take-off 10, fluid is drawn from the reservoir 6 and forced through the chamber 5 and the conduits 22 into the cylinders 21, thereby actuating the pistons 23 against the tension of the springs 38. When the pistons 23 are thus actuated the members 30 force the arms 26 downwardly against the ground thereby raising the wheels 19 of the vehicle. As the pistons 23 are actuated by the fluid entering the cylinders 21 the flexible elements 37 are payed toward the safety rods 34. Thus, as the arms 26 are swung downwardly the safety rods 34 are swung to a substantially vertical position between the cylinders 21 and the free end portions of the arms 26. When it is desired to lower the vehicle the valve 40 is set to establish communication between the enlarged end portion 16 of the chamber 5 and the reservoir 6 through the conduit 39. The vehicle then falls by gravity until it comes to rest on the wheels 19, the pistons 23 being forced forwardly for expelling a portion of the fluid from the cylinders 21 and returning said fluid to the reservoir 6. After the vehicle comes to rest on its wheels 19 the arms 26 are raised out of engagement with the ground and returned to inoperative position by the springs 38. As the pistons 23 move in this direction the flexible wire or other strands 37 return the safety rods 34 to inoperative position.

It is believed that the many advantages of a hydraulic vehicle jack constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

A vehicle jack of the character described comprising a horizontal cylinder mounted on the vehicle adjacent one of the wheels thereof, a fluid actuated piston operable in the cylinder, a ground engaging lifting arm pivotally mounted on the cylinder, means operatively connecting said lifting arm to the piston for actuation thereby, and a safety rod having one end pivotally and slidably connected to the cylinder and its other end pivotally connected to the free end portion of said lifting arm.

EARLING HOO.